Patented Dec. 5, 1933

1,938,043

UNITED STATES PATENT OFFICE 1,938,043

CONDENSATION PRODUCTS OF THE ANTHRAQUINONE SERIES AND PROCESS OF MAKING SAME

Heinz Scheyer, Frankfort-on-the-Main, Germany, assignor to General Aniline Works, Inc., New York, N. Y., a corporation of Delaware No Drawing. Application March 3, 1932, Serial No. 596,665, and in Germany March 17, 1931

4 Claims. (Cl. 260—57)

My present invention relates to new condensation products of the anthraquinone series and to a process of preparing same.

The initial materials I use as starting material for the present process are the dimolecular conversion products of methylene-anthrone and its substitution products which are described and claimed in my copending U. S. application Serial No. 564,157, filed September 21, 1931, and which correspond probably to one of the formulæ:

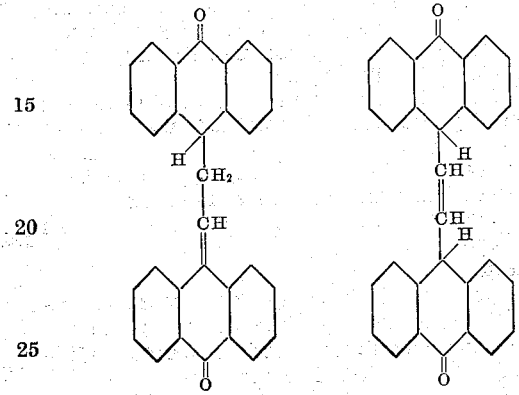

wherein each anthraquinone nucleus may contain monovalent substituents such as halogen, an alkyl, aryl, acylamino or sulfonic acid group.

According to the first step of my present process the said initial materials are treated with suitable oxidizing agents. As such oxidizing agents there may be used: hypochlorite solutions, potassium permanganate, potassium ferricyanide or sulfuryl chloride. A suitable organic diluent may be admixed, whereby also such diluents may be used which as such show the property of being oxidizable themselves. In case alkaline oxidizing agents are used one may start also from methylene anthrone or its substitution products themselves, since these compounds probably form by means of the alkali the aforesaid dimolecular initial materials.

The products of this first step of my process represent nearly colorless substances which may be recrystallized from organic solvents. They yield in concentrated sulfuric acid yellowish colored solutions and are insoluble in alkalies.

According to the second step of my process, the said products obtained by the first step are heated with alkaline condensing agents. A suitable organic diluent may advantageously be added.

The products of this second step of my process represent intensely colored substances which are soluble in concentrated sulfuric acid with greenish tints and in the usual organic solvents with a red fluorescence. By means of an alkaline hydrosulfite solution they may be converted into intensely colored reduction products, by reoxidation the reduction products are reconverted into the original condensation products. When mixed with the customary substrata they yield clear color lakes of good fastness to light.

The chemical constitution of all my new compounds, both the intermediate products of the first step and the final products of the second step of my process, is as yet unknown. Thus formulæ thereof cannot be given.

In order to further illustrate my invention the following examples are given, the parts being by weight and all temperatures in centigrade degrees. But I wish it, however, to be understood that my invention is not limited to the particular conditions nor specific products mentioned therein.

Example 1

10 parts of the yellow condensation product obtained by condensing methyleneanthrone by means of an acid condensing agent, which melts after being boiled with glacial acetic acid at 254°, are dissolved in 90 parts of methanol and 10 parts of caustic soda solution of 33° Bé. Then a hypochlorite solution containing about 14% of chlorine is allowed to drop in at boiling temperature, until the original yellowish color of the solution has disappeared. The colorless precipitate thus formed is filtered, washed alkali-free and dried. By treating it with benzene it may be freed from impurities which are easier soluble. By recrystallizing from chloro-benzene colorless red-shaded crystals are obtained which yield with concentrated sulfuric acid a golden yellow solution and melt while darkening at about 260°.

Example 2

10 parts of the starting material of Example 1 are dissolved in 90 parts of methanol and 10 parts of caustic soda solution of 33° Bé. Then a warm saturated solution of potassium permanganate is introduced drop by drop at boiling temperature while violently stirring until the original yellow red color of the solution has disappeared. The precipitate thus formed is filtered, washed alkali-free, acidified and freed from the adhering mangan peroxide by mixing it with bisulfite. The product may be purified in the manner described in Example 1 and shows the properties above mentioned.

Instead of permanganate, potassium ferricyanide may be used with the same success.

*Example 3*

10 parts of methylene-anthrone are dissolved in 90 parts of methanol and 10 parts of caustic soda solution of 33° Bé. To the solution a hypochlorite solution of about 14% of chlorine is introduced at boiling temperature drop by drop while stirring. When the yellowish red color of the solution has disappeared the formed precipitate is worked up as described in Example 1. The product thus obtained is identical to that of Example 1.

*Example 4*

10 parts of the yellow condensation product obtained by condensing methylene-2-choranthrone by means of an acid condensing agent and melting at about 234° C. are dissolved in the hot in 90 parts of methanol and 10 parts of caustic soda solution of 33° Bé. The solution is mixed while stirring with the solution of sodium hypochlorite. The yellowish red alkaline solution decolorizes and a nearly colorless precipitate forms which is filtered and washed. It may be freed from easier soluble impurities by mixing it with a small amount of benzene and filtering. By dissolving it in chloroform and precipitating therefrom by means of ether it is obtained in the form of colorless crystals melting with decomposition at about 294. The new compound dissolves in concentrated sulfuric acid with an orange yellow tint and is insoluble in alkalies.

Similar compounds are obtained by starting from the dimolecular compounds of 9-methylene-3-chloro-or 2-methyl-or 2-phenyl-anthrone.

*Example 5*

10 parts of starting material used in Example 1 are introduced while stirring into 30 parts of sulfuryl chloride. Thereby a violent evolution of hydrogen chloride occurs and, while the yellow crystals of the starting material quickly disappear, a precipitate of a colorless crystallized compound forms. The mass is stirred for further half an hour and then the precipitate is separated from the liquor. The raw product which contains chlorine melts at about 190° with decomposition. The new compound is obtained in the form of colorless rhombic crystals by dissolving the raw product in chloroform and precipitating the solution by means of ether.

*Example 6*

10 parts of the starting material used in Example 4 are introduced while stirring into 50 parts of sulfuryl chloride which is warmed to 40°. The material dissolves with an evolution of hydrogen chloride. After the introduction of the whole amount of starting material, the mass is stirred for further 20 minutes. Then the solution is dropped into 500 parts of water warmed to about 60° while stirring. The new compound precipitates as a granulous light-yellowish precipitate which is filtered and washed acid-free. The compound is easily soluble in organic solvents as for instance ether, chloroform, benzene.

*Example 7*

10 parts of the product obtained according to Example 1 are heated to about 90° while stirring with 30 parts of caustic potash and 70 parts of ethyl alcohol. The liquor becomes first violettish red then blue. When the starting material has disappeared, the mass is introduced into ice water and the precipitate containing partially a blue reduction product is oxidized, for instance with a hypochlorite solution. The color of the precipitate turns thereby to violettish red. It forms small reddish violet crystals of a metallic luster. The dry product dissolves in the customary organic solvents with an intense reddish violet fluorescence. It dissolves in concentrated sulfuric acid with a green tint and yields when mixed with a suitable substrata a violettish red color lake of a very good fastness to light.

*Example 8*

10 parts of the product obtained according to Example 5 are slowly heated to 120° while stirring with 50 parts of caustic potash and 50 parts of ethyl alcohol. The mass becomes thereby first violet then blue. It is stirred at 120° until all unchanged starting material has disappeared. Then the mass is introduced by stirring into ice-water and the precipitated dyestuff is filtered. It represents when dry an intense reddish violet powder soluble in organic solvents with a violet tint and intense red fluorescence. In concentrated sulfuric acid it dissolves to a yellowish green solution. As to properties, it corresponds to the dyestuff of Example 7.

When the starting material of this example is replaced by the product obtained according to Example 6, a dyestuff is obtained which represents violet needles soluble in organic solvents with a violet tint and an intense red fluorescence and soluble in concentrated sulfuric acid with an olive-green tint.

I claim:

1. A process which comprises treating a dimolecular conversion product of methylene-anthrone or its substitution products corresponding probably to one of the formulæ:

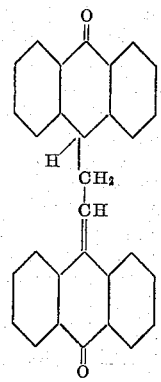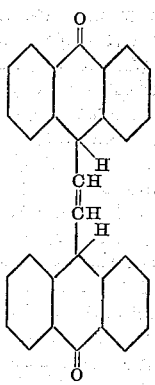

wherein each anthraquinone nucleus may contain halogen, an alkyl, aryl, acylamino or sulfonic group, with an oxidizing agent of the group consisting of hypochlorite, permanganate, ferricyanide and sulfurylchloride and condensing the substances thus formed by means of alkaline condensing agents.

2. A process which comprises treating the dimolecular conversion product of methylene-anthrone corresponding probably to one of the formulæ:

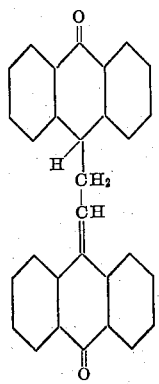 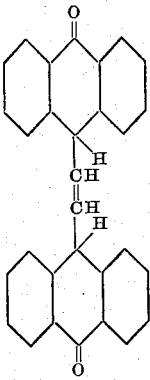

with sulfuryl chloride and condensing the substance thus formed by means of alcoholic caustic potash.

3. The condensation products obtainable by treating a dimolecular conversion product of methylene-anthrone or its substitution products corresponding probably to one of the formulæ:

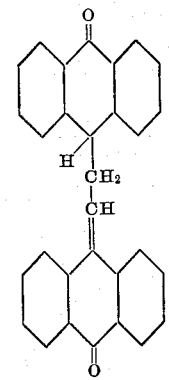 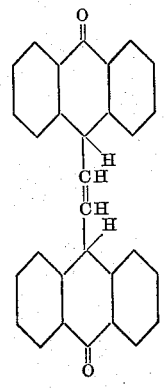

wherein each anthraquinone nucleus may contain halogen, an alkyl, aryl, acylamino or sulfonic group, with an oxidizing agent of the group consisting of hypochlorite, permanganate, ferricyanide and sulfurylchloride and condensing the substances thus formed by means of alkaline condensing agents, which compounds represent intensely colored substances soluble in concentrated sulfuric acid with greenish tints and in the usual organic solvents with a red fluorescence, yielding when mixed with the customary substrata clear color lakes of a good fastness to light.

4. The conversion product obtainable by treating the dimolecular conversion product of methylene-anthrone corresponding probably to one of the formulæ:

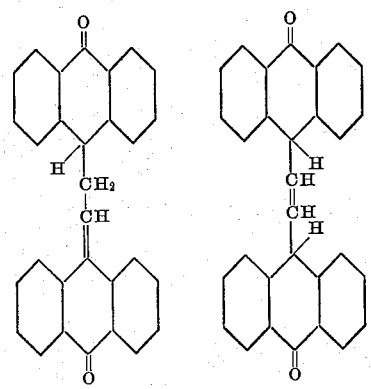

with sulfuryl chloride and condensing the substance thus formed by means of alcoholic caustic potash, which compound represents when dry an intense reddish violet powder, soluble in organic solvents with a violet tint and intense red fluorescence and in concentrated sulfuric acid to a yellowish green solution, yielding when mixed with the customary substrata violettish red color lakes of a good fastness to light.

HEINZ SCHEYER.